(12) United States Patent  
Wraight

(10) Patent No.: US 8,907,289 B2  
(45) Date of Patent: Dec. 9, 2014

(54) SUBATOMIC PARTICLE DETECTOR CAPABLE OF IGNORING SHOCK INDUCED COUNTS

(75) Inventor: Peter David Wraight, Skillman, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 377 days.

(21) Appl. No.: 13/450,796

(22) Filed: Apr. 19, 2012

(65) Prior Publication Data

US 2013/0277562 A1   Oct. 24, 2013

(51) Int. Cl.
 *G01T 1/20* (2006.01)

(52) U.S. Cl.
 USPC ........................................ 250/361 R; 250/362

(58) Field of Classification Search
 CPC ................................. G01T 1/202; G01T 3/06
 USPC ............................................. 250/361 R, 362
 See application file for complete search history.

(56) References Cited

U.S. PATENT DOCUMENTS

2009/0278053 A1* 11/2009 Friedman et al. ............. 250/375
2011/0241839 A1* 10/2011 Lal et al. ...................... 340/10.1

* cited by examiner

*Primary Examiner* — David Porta
*Assistant Examiner* — Mindy Vu
(74) *Attorney, Agent, or Firm* — Cathy Hewitt

(57) ABSTRACT

A subatomic particle detection apparatus includes a scintillator to scintillate if struck by subatomic particles, and to scintillate if subjected to mechanical stresses, the scintillator to emit an electrical discharge if scintillating due to the mechanical stresses. A detector is optically coupled to the scintillator to detect scintillations by the scintillator. Furthermore, an antenna is associated with the scintillator and/or the detector to detect the electrical discharge. In addition, circuitry is coupled to the detector and the antenna to determine whether the scintillator scintillated due to the mechanical stresses, based upon the antenna detecting the electrical discharge.

28 Claims, 2 Drawing Sheets

SUBATOMIC PARTICLE DETECTOR CAPABLE OF IGNORING SHOCK INDUCED COUNTS

FIELD OF THE DISCLOSURE

This disclosure related to subatomic particle detectors, and in particular, subatomic particle detectors having increased accuracy due to their ability to ignore false counts induced by shock.

BACKGROUND

Particle generators, such as neutron generators and gamma ray generators, are often used together with particle detectors, such as neutron detectors and gamma ray detectors, to log a subsurface formation. For example, by sending particles into a formation, detecting the resulting particles that either bounce back or are generated as a result of the sent particles striking atoms in the formation, and analyzing those detections, useful information about the formation can be discerned and the formation can thus be logged.

A typical particle detector includes a scintillation detector package that is optically coupled to a photomultiplier tube (PMT). The scintillation detector package includes a scintillator crystal that scintillates when struck by particles to which it is attuned (i.e. neutrons, gamma rays). As particles strike the scintillator crystal and cause it to emit light pulses, the PMT detects the light pulses and converts them from the optical domain to the electrical domain. Processing circuitry may then be used to analyze the converted light pulses.

A detector used in a downhole application to log a formation may be exposed to both thermal and mechanical stresses. Unfortunately, mechanical stresses can cause a scintillator crystal to scintillate via triboluminescence, an optical phenomenon in which light is generated when a material is pulled apart, ripped, scratched, crushed, or rubbed, through the breaking of chemical bonds in the material. It thus follows that if the scintillator crystal were to emit a light due to mechanical stress, the PMT might detect and convert that "false" light pulse.

This is an undesirable situation, as the accuracy and resolution of the resulting log could be degraded by the false light pulses. Current approaches at reducing the degradation to a log due to false light pulses revolve around trying to better isolate the scintillation crystal from mechanical stress and shock. While these approaches may indeed be successful in reducing the number of false light pulses emitted by the scintillation crystal, eliminating a majority of false light pulses may be extremely difficult. In addition, these approaches may increase the cost or reduce the size of a detector by an undesirable amount.

As such, new ways of reducing the degradation to a log due to false light pulses emitted by a scintillator crystal is desired.

SUMMARY

The disadvantages of the prior approaches described above are addressed by a subatomic particle detection apparatus that may incude a scintillator to scintillate if struck by subatomic particles, and to scintillate if subjected to mechanical stresses, the scintillator to emit an electrical discharge if scintillating due to the mechanical stresses. A detector may be optically coupled to the scintillator to detect scintillations by the scintillator. In addition, an antenna may be associated with the scintillator and/or the detector to detect the electrical discharge. Further, circuitry may be coupled to the detector and the antenna to determine whether the scintillator scintillated due to the mechanical stresses, based upon the antenna detecting the electrical discharge.

A scintillator for subatomic particle detection apparatus may include a housing. A scintillator crystal may be carried within the housing, may scintillate if struck by subatomic particles and may also scintillate if subjected to mechanical stresses. In addition, the scintillator crystal may emit an electrical discharge if scintillating due to the mechanical stresses. An antenna may be carried by the housing to detect the electrical discharge emitted by the scintillator crystal if scintillating due to mechanical stresses.

A subatomic particle detector may be for use with a scintillator to scintillate if struck by subatomic particles and to scintillate if subjected to mechanical stresses, the scintillator to emit an electrical discharge if scintillating due to the mechanical stresses. The subatomic particle detector may include a housing, and a photomultiplier carried within the housing and optically coupled to the scintillator to detect scintillations by the scintillator. An antenna may be carried by the housing to detect the electrical discharge. Circuitry may be coupled to the detector and the antenna to determine whether the scintillator scintillated due to the mechanical stresses, based upon the antenna detecting the electrical discharge.

A method may be for operating a subatomic particle detection apparatus including a scintillator to scintillate if struck by subatomic particles and to scintillate if subjected to mechanical stresses, the scintillator to emit an electrical discharge if scintillating due to the mechanical stresses. The method may comprise detecting scintillations by the scintillator, using a detector optically coupled to the scintillator. The method may also include detecting the electrical discharge emitted by the scintillator if scintillating due to the mechanical stresses, using an antenna associated with the scintilator and/or the detector. The method may further include determining whether the scintillator scintillated due to the mechanical stresses based upon the antenna detecting the electrical discharge.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
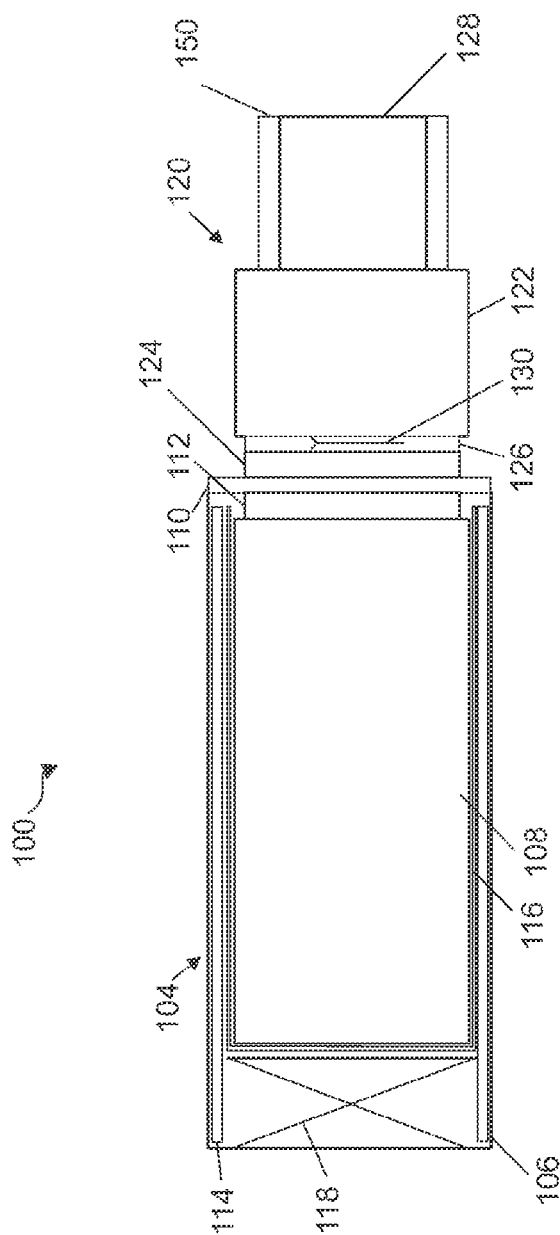
FIG. 1 is a schematic view of a subatomic particle detection apparatus in accordance with the present disclosure.

With reference to FIG. 1, a subatomic particle detector 100 is now described. The detector 100 includes a scintillator package 104 and a detector, such as a photomultiplier tube (PMT) 120, optically coupled thereto. It should be understood that any detector capable of detecting light, as known to those of skill in the art, may be used.

The scintillator package 104 includes a housing 106 carrying a scintillation crystal 108 that scintillates (emits light) when struck by subatomic particles. A Teflon reflector 116 is wrapped around the scintillation crystal 108 in the housing 106 so as to help guide and focus the emitted light out of the scintillator package 104 through the sapphire crystal window 110 that caps the open end of the housing. An optical coupling pad 112 couples the scintillation crystal 108 to the sapphire crystal window 110.

In addition, the scintillator package 104 includes an elastomeric boot 114 (Saint Gobain patent needs to be referenced) between the scintillation crystal 108 and the housing 106 to tightly hold the scintillation crystal in place as well as to dampen vibrations passed to the scintillation crystal from the housing. A biasing element 118, such as a spring, biases the scintillation crystal 108 against the optical coupling pad 112 to help prevent decoupling of the scintillation crystal 108 from the sapphire crystal window 110.

As explained above, the scintillation crystal 108 scintillates when struck by subatomic particles. The scintillation crystal 108 may be selected such that it scintillates when struck by gamma rays, by x-rays, or by neutrons, for example, and thus the subatomic particle detector 100 may be a gamma ray detector, an x-ray detector, or neutron detector. By "scintillate," it is meant that the scintillation crystal 108 exhibits the property of luminescence when excited by ionizing radiation. When struck by an incoming subatomic particle, the scintillation crystal 108 absorbs its energy, and then re-emits that energy in the form of light.

Unfortunately, as explained above, scintillation crystals 108 also scintillate when subjected to mechanical stresses, such as the material being pulled apart, ripped, scratched, crushed, or rubbed. Due to the hostile nature of a downhole environment, the scintillator package 104 may experience sharp accelerations and decelerations (i.e. shock), and thus the scintillation crystal 108 may be subjected to the above referenced mechanical stresses. In addition, the scintillation crystal 108 may become separated from the optical coupling pad 112, or the optical coupling pad may become separated from the sapphire crystal window 110, resulting in mechanically induced light at the interfaces which also can be detected as apparent scintillation light leading to false readings. Thus, it should be understood that when the scintillator package 104 is referred to as scintillating due to mechanical stresses, the scintillation may not necessarily be due to the mechanical stresses experienced by the scintillation crystal 108 itself but rather by the sapphire crystal window 110 and optical coupling pad 112. The process by which scintillation crystals 108 scintillate when subjected to mechanical stresses is known as triboluminescence, and is believed to be caused by the separation and reunification of electrical charges, as will be appreciated by those of skill in the art.

The PMT 120 detects the light emitted by the scintillation crystal 108 and converts that light into the electrical domain for analysis. Since the aim of the subatomic particle detector 100 is to count subatomic particles that strike it, the counting of scintillations due to mechanical stresses is undesirable. While the elastomeric boot 114 helps reduce the number of scintillations due to mechanical stresses, they still occur.

The inventor has found that scintillation crystals 108 emit an electrical discharge when scintillating due to mechanical stresses, but not when scintillating because they are struck by subatomic particles. Therefore, the subatomic particle detector 100 includes an antenna 130 to detect these electrical discharge emitted by the scintillation crystal 108 when scintillating due to mechanical stresses. The antenna 130 may be positioned between the scintillator 104 and the PMT 120, or may be integrated into either, as will be described in detail below.

In the embodiment shown in FIG. 1, the PMT 120 includes a housing 122 carrying a sapphire PMT window 126. An optical coupling pad 124 couples the sapphire PMT window 126 to the sapphire crystal window 110 of the scintillator 104. Photomultiplier circuitry 128 is carried within the housing 122 which amplifies and detects the electron signal after the actual conversion of the light emitted by the scintillation crystal 108 to the electrical domain by the photocathode of the PMT. The photomultiplier circuitry 128 outputs a signal indicating detection of scintillation. In this embodiment, the antenna 130 is illustratively disposed on the surface of the PMT window 126, but it should be appreciated that in other embodiments the antenna may be disposed on the surface of the sapphire crystal window 110 of the scintillator 104. In such an embodiment, the housing 106 of the scintillator 104 may have a hole formed therein to accommodate a conductor coupled to the antenna 130, with a sealing member environmentally sealing between the hole and conductor. Referring back to the illustrated embodiment, the antenna 130 is desirably thin so as to avoid obstructing light emitted by the scintillation crystal 108.

Figure 2:
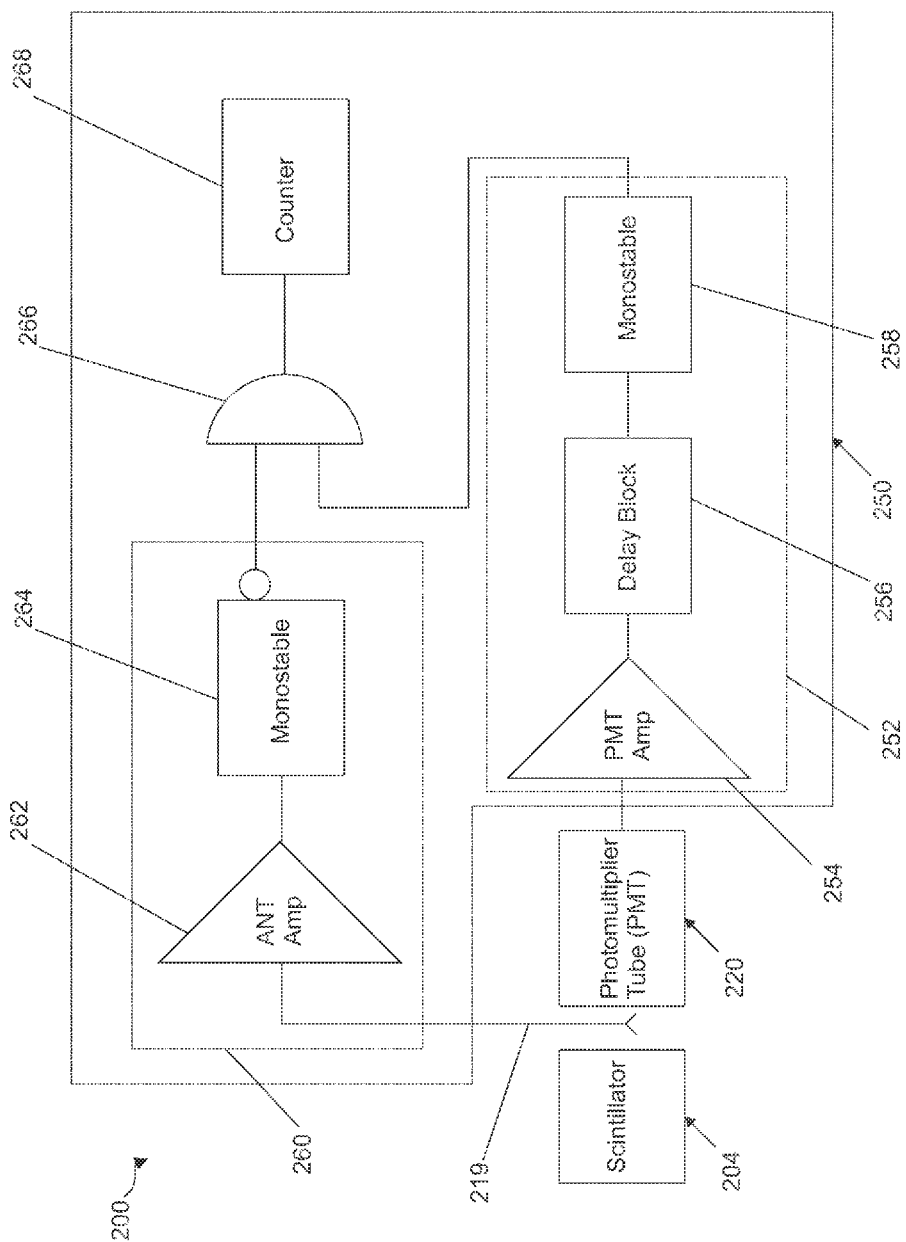
FIG. 2 is a block diagram of a subatomic particle detection apparatus in accordance with the present disclosure.

Circuitry 150 is coupled to the PMT 120 and the antenna 130 to count a number of scintillations by the scintillator 104 due to the scintillation crystal 108 being struck by the subatomic particles while ignoring scintillations by the scintillator due to mechanical stresses. A possible configuration for the circuitry 150 will now be described with reference to the circuitry 250 shown in FIG. 2.

The circuitry 250 includes a PMT circuitry path 252 to output a PMT logic value when the PMT 220 detects scintillations (regardless of their cause), and an antenna circuitry path 260 to output an antenna logic value when the antenna 230 detects the electrical discharge emitted by the scintillator 204 when scintillating due to mechanical stresses. The PMT logic value indicates that the PMT 220 has detected a scintillation, and the antenna logic value indicates that the antenna 230 has detected an electrical discharge from the scintillator 204 indicating that the scintillation was due to the mechanical stresses.

A logic gate 266 is coupled to the PMT circuitry path 252 and the antenna circuitry path 260 to output a count logic value when the PMT logic value indicates that the PMT 220 detects scintillation and the antenna logic value indicates that the antenna 230 does not detect an electrical discharge from the scintillator 204. Therefore, the count logic value output by the logic gate 266 reflects scintillations due to subatomic particles striking the scintillator 204 but not scintillations due to mechanical stresses experienced by the scintillator. Consequently, a counter 268 coupled to the logic gate 266 is able to accurately count the number of subatomic particles that struck the scintillator 204. An accurate count of the number of subatomic particles that strike the scintillator 204 allows an accurate analysis of a formation in the earth to determine properties such as shale volume from the natural gamma flux, porosity, or density when using active sources of radiation The PMT circuitry path 252 includes an amplifier 254 coupled to the PMT 220. A delay block 256 is coupled to the amplifier 254 to receive a signal from the PMT 220 indicating detection of scintillation and to output a delayed version of the signal. This delay block may be a monostable in some applications. The purpose of this delay block 256 is to give the antenna circuitry path 260 the time to detect an electrical discharge indicating that a scintillation was due to mechanical stresses and not due to a subatomic particle striking the scintillator 204. The inventor has found that a delay of 30 microseconds is sufficient in some applications.

A monostable 258 is coupled to the delay block 256 to output the PMT logic value to the logic gate 266 based upon the delayed version of the signal. The monostable 258, as will be understood by those skilled in the art, outputs the PMT logic value for a specific period of time before reverting to its standard state.

The antenna circuitry path 260 includes an amplifier 262 coupled to the antenna 230. A monostable 264 is coupled to the amplifier 262, and outputs the antenna logic signal to the logic gate 266 for a specific period of time.

It should be understood that the present disclosure is applicable to a variety of subatomic particle detectors with simple changes made to the delay provided by the delay block, and to the time the monostables output the logic signals they receive.

In addition, it should be understood that the circuitry 250 may be configured differently. For example, the circuitry 250 may be configured such that it counts a total number of scintillations, counts a number of scintillations due to the scintillator 204 experiencing mechanical stresses, and subtracts the latter count from the former count. This would also result in an accurate count of the number of scintillations due to subatomic particles striking the scintillator 204.

While the foregoing has been described with respect to a limited number of embodiments, those skilled in the art, having benefit of this disclosure, will appreciate that other embodiments can be envisioned that do not depart from the scope of the disclosure herein. Accordingly, the scope of this disclosure shall be limited only by the attached claims.

That which is claimed is:

1. A subatomic particle detection apparatus comprising:
    a scintillator to scintillate if struck by subatomic particles, and to scintillate if subjected to mechanical stresses, the scintillator to emit an electrical discharge if scintillating due to the mechanical stresses;
    a detector optically coupled to the scintillator to detect scintillations by the scintillator;
    an antenna associated with the scintillator and/or the detector to detect the electrical discharge; and
    circuitry coupled to the detector and the antenna to determine whether the scintillator scintillated due to the mechanical stresses, based upon the antenna detecting the electrical discharge.

2. A subatomic particle detection apparatus according to claim 1, wherein the circuitry counts a number of scintillations due to the scintillator being struck by the subatomic particles by counting a number of scintillations detected by the detector, counting a number of scintillations determined to be due to the mechanical stresses, and subtracting the number of scintillations determined to be due to the mechanical stresses from the number of scintillations detected by the detector.

3. A subatomic particle detection apparatus according to claim 1, wherein the circuitry counts a number of scintillations due to the scintillator being struck by the subatomic particles by counting a number scintillations detected by the detector while not counting the scintillations determined to be due to the mechanical stresses.

4. A subatomic particle detection apparatus according to claim 3, wherein the circuitry comprises:
    a detector circuitry path to output a detector logic value if the detector detected a scintillation;
    an antenna circuitry path to output an antenna logic value if the antenna detected the electrical discharge; and
    a logic gate, coupled to the detector circuitry path and the antenna circuitry path, to output a count logic value if the detector logic value indicates that the detector detected a scintillation and the antenna logic value indicates that the antenna did not detect the electrical discharge.

5. A subatomic particle detection apparatus according to claim 4, wherein the detector circuitry path comprises:
    a delay block coupled to the detector to receive therefrom a signal indicating a scintillation was detected and to output a delayed version of the signal; and
    a monostable coupled to the delay block to output the detector logic value based upon the delayed version of the signal.

6. A subatomic particle detection apparatus according to claim 5, wherein the detector circuitry path further comprises an amplifier coupling the delay block to the detector.

7. A subatomic particle detection apparatus according to claim 4, wherein the antenna circuitry path comprises a monostable coupled to the antenna to output the antenna logic value indicating detection of the electrical discharge.

8. A subatomic particle detection apparatus according to claim 7, wherein the antenna circuitry path further comprises an amplifier coupling the antenna to the monostable.

9. A subatomic particle detection apparatus according to claim 1, wherein the antenna is positioned between the scintillator and the detector.

10. A subatomic particle detection apparatus according to claim 1, wherein the antenna is integrated with the scintillator.

11. A subatomic particle detection apparatus according to claim 1, wherein the antenna is integrated with the detector.

12. A scintillator for subatomic particle detection apparatus comprising:
    a housing;
    a scintillator crystal carried within the housing and to scintillate if struck by subatomic particles and to scintillate if subjected to mechanical stresses, the scintillator crystal to emit an electrical discharge if scintillating due to the mechanical stresses; and
    an antenna carried by the housing to detect the electrical discharge emitted by the scintillator crystal if scintillating due to mechanical stresses.

13. The scintillator of claim 12, wherein the housing has an open end; further comprising a window sealing the open end of the housing; and wherein the antenna is disposed on the window.

14. The scintillator of claim 13, further comprising an optical coupling pad coupling the scintillator to the window; wherein scintillations and an electrical discharge are produced due to a decoupling of the optical coupling pad from the scintillator and/or the window caused by the mechanical stresses; and wherein the antenna also detects the electrical discharge produced due to the decoupling caused by the mechanical stresses.

15. The scintillator of claim 12, further comprising a conductor coupled to the antenna; and wherein the housing has an opening defined therein to receive the conductor such that the conductor extends from the antenna to a location outside the housing.

16. The scintillator of claim 15, further comprising a member forming an environmental seal between the opening in the housing and the conductor.

17. A subatomic particle detector for use with a scintillator to scintillate if struck by subatomic particles and to scintillate if subjected to mechanical stresses, the scintillator to emit an electrical discharge if scintillating due to the mechanical stresses, the subatomic particle detector comprising:
- a housing;
- a photomultiplier carried within the housing and optically coupled to the scintillator to detect scintillations by the scintillator;
- an antenna carried by the housing to detect the electrical discharge; and
- circuitry coupled to the detector and the antenna to determine whether the scintillator scintillated due to the mechanical stresses, based upon the antenna detecting the electrical discharge.

18. A subatomic particle detector according to claim 17, wherein the housing has an open end; further comprising a window sealing the open end of the housing; and wherein the antenna is disposed on the window.

19. A subatomic particle detector according to claim 17, wherein the circuitry counts a number of scintillations due to the scintillator being struck by the subatomic particles by counting a number scintillations detected by the detector while not counting the scintillations determined to be due to the mechanical stresses.

20. A subatomic particle detector according to claim 19, wherein the circuitry comprises:
- a detector circuitry path to output a detector logic value if the detector detected a scintillation;
- an antenna circuitry path to output an antenna logic value if the antenna detected the electrical discharge; and
- a logic gate, coupled to the detector circuitry path and the antenna circuitry path, to output a count logic value if the detector logic value indicates that the detector detected a scintillation and the antenna logic value indicates that the antenna did not detect the electrical discharge.

21. A subatomic particle detector according to claim 20, wherein the detector circuitry path comprises:
- a delay block coupled to the detector to receive therefrom a signal indicating that a scintillation was detected and to output a delayed version of the signal; and
- a monostable coupled to the delay block to output the detector logic value based upon the delayed version of the signal.

22. A subatomic particle detector according to claim 20, wherein the antenna circuitry path comprises a monostable coupled to the antenna to output the antenna logic value indicating detection of the electrical discharge.

23. A method of operating a subatomic particle detection apparatus including a scintillator to scintillate if struck by subatomic particles and to scintillate if subjected to mechanical stresses, the scintillator to emit an electrical discharge if scintillating due to the mechanical stresses, the method comprising:
- detecting scintillations by the scintillator, using a detector optically coupled to the scintillator;
- detecting the electrical discharge emitted by the scintillator if scintillating due to the mechanical stresses, using an antenna associated with the scintilator and/or the detector; and
- determining whether the scintillator scintillated due to the mechanical stresses based upon the antenna detecting the electrical discharge.

24. A method according to claim 23, further comprising counting a number of scintillations due to the scintillator being struck by the subatomic particles by counting a number of scintillations detected by the detector while not counting the scintillations determined to be due to the mechanical stresses, using the circuitry.

25. A method according to claim 24, wherein determining whether the scintillator scintillated due to the mechanical stresses comprises:
- outputting a detector logic value if the detector detected scintillation, using a detector circuitry path of the circuitry;
- outputting an antenna logic value if the antenna detected the electrical discharge, using an antenna circuitry path of the circuitry; and
- outputting a count logic value when the detector logic value indicates that the detector detected scintillation and the antenna logic value indicates that the antenna did not detect an electrical discharge from the scintillator, using a logic gate of the circuitry coupled to the detector circuitry path and the antenna circuitry path.

26. A method according to claim 25, wherein outputting a detector logic value comprises:
- receiving a signal from the detector indicating detection of scintillation and outputting a delayed version of the signal, using a delay block coupled to the detector; and
- outputting the detector logic value based upon the delayed version of the signal, using a monostable coupled to the delay block.

27. A method according to claim 25, wherein outputting an antenna logic comprises outputting the antenna logic value, using a monostable coupled to the antenna.

28. A method according to claim 25, further comprising counting a number of receipts of the count logic value, using a counter coupled to the logic gate.

* * * * *